G. A. KEENE.
Combined Measure and Funnel.

No. 225,755. Patented Mar. 23, 1880.

WITNESSES.
John M. Robertson
George V. Mallon

INVENTOR:
George A. Keene
By his Atty.
Henry W. Williams

UNITED STATES PATENT OFFICE.

GEORGE A. KEENE, OF LYNN, MASSACHUSETTS, ASSIGNOR OF ONE-HALF OF HIS RIGHT TO CHARLES HEALEY, OF SAME PLACE.

COMBINED MEASURE AND FUNNEL.

SPECIFICATION forming part of Letters Patent No. 225,755, dated March 23, 1880.

Application filed January 16, 1880.

*To all whom it may concern:*

Be it known that I, GEORGE A. KEENE, of Lynn, in the county of Essex and State of Massachusetts, have invented new and useful Improvements in Combined Measures and Funnels, of which the following is a specification.

My invention relates to improvements in combined measures and funnels for measuring liquids; and the objects of the improvements are to provide a graduated cast funnel and measure lined with porcelain, so as to be impervious to acids, and having a vertical rod provided at intervals with adjustable indicators for the purpose of enabling the vessel to be accurately sealed, and to provide means for holding the plunger-rod which supports the stopple in any position, such means consisting of an anti-acid stuffing-box supported by a narrow cross-bar, substantially as below described.

Figure 1:
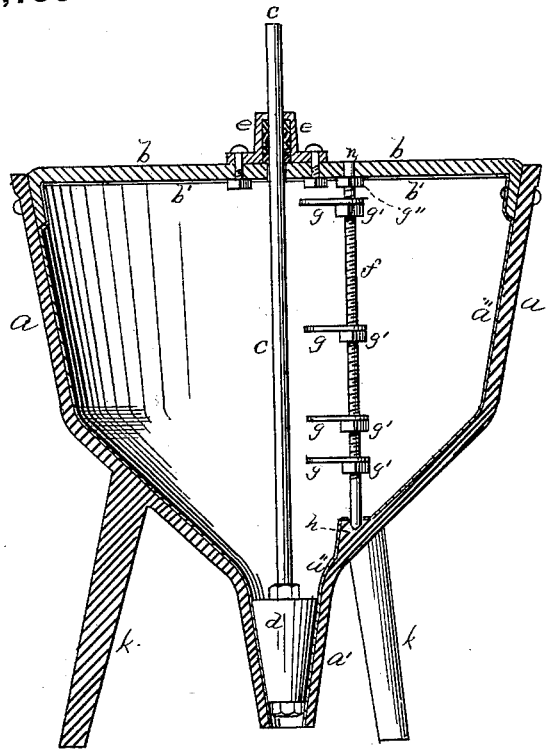
Figure 2:
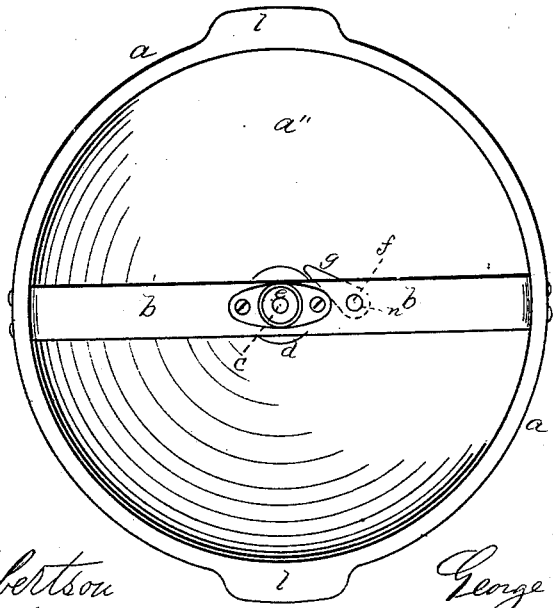

In the accompanying drawings, in which similar letters of reference indicate corresponding parts, Figure 1 is a longitudinal vertical section of a vessel embodying my invention. Fig. 2 is a plan view of the same.

$a$ is a graduated cast measure and funnel, $a'$ being its discharge-tube, lined throughout with porcelain or other lining, $a''$, capable of resisting the action of acids—as in measuring vinegar, for instance. $b$ is a narrow cross-bar, made narrow so as not to exclude the light from the vessel, and provided with porcelain $b'$ upon its under side. $c$ is a centrally-situated vertical plunger-rod, supporting the stopple $d$ and passing through the stuffing-box $e$, which is secured to the cross-bar $b$, and is filled with material incapable of being destroyed by acids. By means of this stuffing-box the rod $c$ may be held in a raised position while the contents of the vessel are emptied into the receptacle below.

$f$ is the measuring-rod, having a screw-thread cut upon it, supported at its lower end in the step $h$, made in the casting, and at its upper end in the cross-bar $b$. $g\ g$ are adjustable indicators, placed upon the screw-thread, each having a nut, $g'$, below it.

To apply the rod $f$, insert it first from the under side in the hole $n$ in the cross-bar; then lift it into the hole in the step $h$ and turn the nut $g''$ up against the cross-bar; adjust the indicators $g\ g$ so as to measure, say, a pint, quart, half-gallon, and gallon; turn the nuts $g'\ g'$ against the indicators, and the vessel is ready for sealing.

$l\ l$ are handles, and $k\ k$ legs, cast with the vessel.

The advantage of a cast vessel for a measure and funnel will be readily perceived when it is remembered that the slightest dent in a vessel made of sheet metal destroys its accuracy. A cast vessel is, of course, absolutely rigid. Again, the porcelain, which is so valuable in measuring vinegar, and which is rigid and brittle in the highest degree, would be valueless if placed upon the interior of a vessel capable of being bent. Upon a cast vessel the porcelain is secure from cracking, and, of course, resists acid.

Among the peculiarities of this measure and funnel are its absolute accuracy by means of the indicators, its capacity for admitting the light, and the holding of the rod $c$ directly and not by means of the stopple.

Having thus fully described my invention, what I claim, and desire to secure by Letters Patent, is—

1. The combination of the measuring-rod $f$, supported in the vessel $a$, and provided with a screw-thread, and the indicators $g\ g$, substantially as and for the purpose set forth.

2. The combination of the measuring-rod $f$, provided with indicators $g\ g$, cross-bar $b$, and step $h$, arranged and constructed substantially as and for the purposes described.

GEORGE A. KEENE.

Witnesses:
HENRY W. WILLIAMS,
GEORGE V. MALLON.